United States Patent
Wei et al.

(10) Patent No.: US 11,297,011 B2
(45) Date of Patent: Apr. 5, 2022

(54) DATA TRANSMISSION METHOD AND COMMUNICATIONS DEVICE

(71) Applicant: Huawei Technologies Co., Ltd., Shenzhen (CN)

(72) Inventors: Hua Wei, Chengdu (CN); Qin Zheng, Shenzhen (CN); Wenhua Du, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 128 days.

(21) Appl. No.: 16/874,191

(22) Filed: May 14, 2020

(65) Prior Publication Data

US 2020/0274831 A1 Aug. 27, 2020

Related U.S. Application Data

(63) Continuation of application No. PCT/CN2018/111426, filed on Oct. 23, 2018.

(30) Foreign Application Priority Data

Nov. 17, 2017 (CN) .......................... 201711153125.8

(51) Int. Cl.
*H04L 12/879* (2013.01)
*H04L 49/901* (2022.01)
(Continued)

(52) U.S. Cl.
CPC ........ *H04L 49/901* (2013.01); *G06F 12/0893* (2013.01); *H04L 47/50* (2013.01); *G06F 2212/608* (2013.01)

(58) Field of Classification Search
None
See application file for complete search history.

(56) References Cited

U.S. PATENT DOCUMENTS

| | | | |
|---|---|---|---|
| 8,429,315 B1* | 4/2013 | Chudgar | G06F 3/00 710/55 |
| 2020/0259766 A1* | 8/2020 | Tian | H04L 49/252 |

FOREIGN PATENT DOCUMENTS

| | | |
|---|---|---|
| CN | 101222444 A | 7/2008 |
| CN | 101594302 A | 12/2009 |

(Continued)

OTHER PUBLICATIONS

Kumar, Addressing Queuing Bottlenecks at high speeds, 2005, IEEE, 1550-4794, pp. 1-8 (Year: 2005).*

*Primary Examiner* — Kouroush Mohebbi
(74) *Attorney, Agent, or Firm* — Conley Rose, P.C.

(57) ABSTRACT

A data transmission method includes obtaining dequeue information that indicates a queue which requests to output data in a communications device and a target data volume that is output from each queue at a time, and the communications device manages the target data volume based on a burst value, reading, based on the queue, a sub-packet descriptor (PD) that is obtained by segmenting the first PD, the sub-PD includes target description information indicating a target data packet, the first PD includes first description information indicating a first data packet set including the target data packet, the first data packet set and the sub-PD are stored in a packet cache including a dynamic random access memory (DRAM), the first PD is stored in a control cache including a static random access memory (SRAM), and determining, the target data packet based on the sub-PD, and sending the target data packet.

14 Claims, 4 Drawing Sheets

(51) Int. Cl.
 *G06F 12/0893* (2016.01)
 *H04L 47/50* (2022.01)

(56) References Cited

FOREIGN PATENT DOCUMENTS

| | | | |
|---|---|---|---|
| CN | 102971997 | A | 3/2013 |
| CN | 103581055 | A | 2/2014 |
| CN | 103647726 | A | 3/2014 |
| CN | 104426797 | A | 3/2015 |
| CN | 106537858 | A | 3/2017 |
| WO | 2016183155 | A1 | 11/2016 |
| WO | 2017008563 | A1 | 1/2017 |

\* cited by examiner

DATA TRANSMISSION METHOD AND COMMUNICATIONS DEVICE

CROSS-REFERENCE TO RELATED APPLICATIONS

This application is a continuation of International Patent Application No. PCT/CN2018/111426 filed on Oct. 23, 2018, which claims priority to Chinese Patent Application No. 201711153125.8 filed on Nov. 17, 2017. The disclosures of the aforementioned applications are hereby incorporated by reference in their entireties.

TECHNICAL FIELD

This application relates to the communications field, and in particular, to a data transmission method and a communications device.

BACKGROUND

In a current data communications system, a data packet is stored in a packet cache of a communications device. The packet cache is generally managed by a packet descriptor (PD). Each PD manages a packet cache that has specific storage space. For example, an 8 gigabytes (GB) packet cache is managed by 1 million (M) PDs, and in this case, each PD manages cache space of 8 GB/1 M=8 kilobytes (kB). Each PD records description information of a data packet stored in cache space managed by the PD, for example, a packet length, a start address and an end address of packet data in the cache space, and a PD pointer that strings the PDs into a linked list.

Cache space managed by one PD may not be used up by one data packet, for example, a volume of the data packet is 1 kB, and the PD manages cache space of 8 kB. If cache space managed by one PD can only store one data packet, a packet cache is wasted. Therefore, currently, there is a packet packing technology that allows a plurality of data packets to be stored in cache space managed by one PD.

However, the packet packing technology requires that all data packets stored in cache space managed by a PD are sent as a whole. For example, a data packet of 1 kB is sent on a bandwidth of 100 megabits per second (Mbps), and in this case, an ideal state is that one data packet is sent every 1 kB×8/100 Mbps=800 microseconds (μ). However, in the packet packing technology, cache space of 8 kB managed by a PD may store eight data packets of 1 kB. In this way, eight data packets are sent every 8×800 μs=6400 μs. A downlink device with a relatively low burst tolerance cannot receive so many data packets at a time, resulting in a packet loss of the downlink device.

SUMMARY

Embodiments of this application provide a data transmission method and a communications device, to reduce a probability of a packet loss of a downlink device.

In view of this, a first aspect of the embodiments of this application provides a data transmission method, including obtaining, by a communications device, dequeue information, where the dequeue information indicates a queue which requests to output data in the communications device and a target data volume that is output from each queue at a time, and the communications device maintains a burst value, and manages the target data volume based on the burst value such that the target data volume is not greater than the burst value, reading, by the communications device, a sub-PD based on the queue, where the queue includes a first PD, the sub-PD is obtained by segmenting the first PD, a quantity of the sub-PDs is not less than two, the sub-PD includes target description information used to indicate a target data packet, the first PD includes first description information used to indicate a first data packet set, the first data packet set includes the target data packet, the first data packet set and the sub-PD are stored in a packet cache, the packet cache including a dynamic random-access memory (DRAM), the first PD is stored in a control cache, and the control cache includes a static random-access memory (SRAM), determining, by the communications device, the target data packet based on the sub-PD, and sending, by the communications device, the target data packet.

In the embodiments of this application, the communications device may generate the dequeue information according to a specific scheduling policy. The dequeue information may be sent to one or more queues. This is not limited herein.

It may be understood that different queues receive the dequeue information at different frequencies. For example, a queue in which a stream with a relatively high transmission speed is located receives the dequeue information at a relatively high frequency, and a queue in which a stream with a relatively low transmission speed is located receives the dequeue information at a relatively low frequency.

Due to different traffic burst tolerance capabilities of downlink devices, to better control a traffic burst, the burst value maintained by the communications device in the embodiments should be as small as possible, and correspondingly, the target data volume that is output from each queue at a time and that is indicated by the dequeue information should also be as small as possible.

In the embodiments of this application, the first PD is stored in the control cache that includes the SRAM, and the sub-PD and data packets are stored in the packet cache that includes the DRAM. It may be understood that a read-write latency of the SRAM is lower than a read-write latency of the DRAM, and costs of the DRAM are lower than costs of the SRAM. Therefore, the first PD that requires a low read-write latency is stored in the control cache, and the sub-PD and the data packets that occupy relatively large storage space are stored in the packet cache.

The communications device obtains the dequeue information, where the dequeue information indicates the queue in which a data packet waits to be output in the communications device and the target data volume that is output from each queue at a time, and the target data volume is not greater than the burst value maintained by the communications device. Then, the communications device reads the sub-PD obtained by segmenting the first PD. The communications device may determine the target data packet based on the sub-PD, where the target data packet belongs to the first data packet set indicated by the first PD. Then, the communications device sends the target data packet. Because each PD in the communications device is segmented into a plurality of sub-PDs, and a size of a data packet indicated by each sub-PD is not greater than the preset burst value, a data volume sent by the communications device does not exceed the preset burst value, thereby reducing a probability of a packet loss of a downlink device.

With reference to the first aspect of the embodiments of this application, in a first implementation of the first aspect of the embodiments of this application, reading, by the communications device, a sub-PD based on the queue includes determining, by the communications device, the first PD at a head of the queue, where the head of the queue refers to an end close to an output port in the queue, and reading, by the communications device, the sub-PD obtained by segmenting the first PD.

In the embodiments of this application, the communications device needs to read a corresponding PD based on a sequence of the queue. Therefore, the first PD that is at the head of the queue should be first determined.

With reference to the first implementation of the first aspect of the embodiments of this application, in a second implementation of the first aspect of the embodiments of this application, the reading, by the communications device, the sub-PD obtained by segmenting the first PD includes obtaining, by the communications device, a sub-PD set, where each sub-PD in the sub-PD set is obtained by segmenting the first PD, determining, by the communications device, ranking in the sub-PD set, where the ranking indicates a sequence of reading sub-PDs in the sub-PD set by the communications device, and reading, by the communications device, the sub-PD that ranks first in the sub-PD set.

It may be understood that, after the communications device determines the first PD at the head of the queue, because the first PD is segmented into a plurality of sub-PDs, the plurality of sub-PDs form a sub-PD set, and the sub-PDs also rank in sequence in the sub-PD set, the communications device needs to first read, according to the ranking of the sub-PDs in the sub-PD set, the sub-PD that ranks first.

With reference to the first implementation of the first aspect of the embodiments of this application, in a third implementation of the first aspect of the embodiments of this application, after the determining, by the communications device, the first PD at a head of the queue, the method further includes recording, by the communications device, a first data volume, where the first data volume is a size of the first data packet set indicated by the first PD.

The communications device may know, by reading the first PD from the control cache, the first data volume indicated by the first PD, and further the communications device needs to record the first data volume.

With reference to the third implementation of the first aspect of the embodiments of this application, in a fourth implementation of the first aspect of the embodiments of this application, after the sending, by the communications device, the target data packet, the method further includes subtracting, by the communications device, the target data volume from the first data volume to obtain a second data volume, where the second data volume is a size of a second data packet that remains after the target data packet is subtracted from the first data packet set.

In the embodiments of this application, the communications device calculates a current second data volume each time the communications device sends a data packet. Therefore, the second data volume is not a fixed value, and the second data volume is decreasing with continuous output of data packets.

With reference to the fourth implementation of the first aspect of the embodiments of this application, in a fifth implementation of the first aspect of the embodiments of this application, the method further includes when a third data volume indicated by a dequeue information set accumulated in the communications device is greater than the second data volume, reading, by the communications device, a second PD, where the second PD is used to indicate the second data packet, and sending, by the communications device, the second data packet.

In the embodiments of this application, while outputting a data packet, the communications device obtains new dequeue information. If a data volume indicated by previous dequeue information has not yet been fully output, and at this time, next dequeue information has been sent to a same queue, the next dequeue information is accumulated. It may be understood that the third data volume is not a fixed value either, and continuously increases with accumulation of dequeue information.

A second aspect of the embodiments of this application provides a communications device, including a scheduling unit configured to send dequeue information, where the dequeue information indicates a target data volume that is output from each queue at a time, and the scheduling unit maintains a burst value, and manages the target data volume based on the burst value such that the target data volume is not greater than the burst value, a queue management unit configured to determine, based on received dequeue information, a queue which requests to output data, where the queue includes a first PD, and a packet cache control unit configured to read a sub-PD based on the queue, determine a target data packet based on the read sub-PD, and send the target data packet, where the sub-PD is obtained by segmenting the first PD, a quantity of the sub-PDs is not less than two, the sub-PD includes target description information used to indicate the target data packet, the first PD includes first description information used to indicate a first data packet set, the first data packet set includes the target data packet, the first data packet set and the sub-PD are stored in a packet cache, the packet cache including a DRAM, the first PD is stored in a control cache, and the control cache includes an SRAM.

With reference to the second aspect of the embodiments of this application, in a first implementation of the second aspect of the embodiments of this application, the queue management unit is further configured to determine the first PD at a head of the queue, where the head of the queue refers to an end close to an output port in the queue.

With reference to the second aspect of the embodiments of this application, in a second implementation of the second aspect of the embodiments of this application, the packet cache control unit is further configured to read the sub-PD that ranks first in a sub-PD set, where each sub-PD in the sub-PD set is obtained by segmenting the first PD, and the ranking indicates a sequence of reading sub-PDs in the sub-PD set by the packet cache control unit.

With reference to the second aspect of the embodiments of this application, in a third implementation of the second aspect of the embodiments of this application, the communications device further includes a queue burst control table configured to record a first data volume, where the first data volume is a size of the first data packet set indicated by the first PD.

With reference to the third implementation of the second aspect of the embodiments of this application, in a fourth implementation of the second aspect of the embodiments of this application, the queue burst control table is further configured to record a second data volume, where the second data volume is obtained by subtracting the target data volume from the first data volume, and the second data volume is a size of a second data packet that remains after the target data packet is subtracted from the first data packet set.

With reference to the fourth implementation of the second aspect of the embodiments of this application, in a fifth implementation of the second aspect of the embodiments of this application, the queue burst control table is further configured to record a third data volume, where the third data volume is a data volume indicated by an accumulated dequeue information set.

With reference to the fifth implementation of the second aspect of the embodiments of this application, in a sixth implementation of the second aspect of the embodiments of this application, when the third data volume is greater than the second data volume, the packet cache control unit is further configured to read a second PD, and send the second data packet indicated by the second PD.

A third aspect of the embodiments of this application provides a network device, including a processing system, an SRAM, a DRAM, a bus, and an input/output interface, where the processing system includes a processor and a forwarding controller, the SRAM stores a first PD, where the first PD includes first description information used to indicate a first data packet set, the DRAM stores a sub-PD set and the first data packet set, where the sub-PD set is obtained by segmenting the first PD, a sub-PD in the sub-PD set includes target description information used to indicate a target data packet, and the first data packet set includes the target data packet, the processor performs the following operation of generating dequeue information, where the dequeue information indicates a queue which requests to output data in the communications device and a target data volume that is output from each queue at a time, and the communications device maintains a burst value, and manages the target data volume based on the burst value such that the target data volume is not greater than the burst value, and the forwarding controller performs the following operations reading the sub-PD based on the queue, determining the target data packet based on the sub-PD, and sending the target data packet.

A fourth aspect of the embodiments of this application provides a computer-readable storage medium. The computer-readable storage medium stores an instruction. When the instruction runs on a computer, the computer performs the processes in the data transmission method in the first aspect.

A fifth aspect of the embodiments of this application provides a computer program product. When the computer program product runs on a computer, the computer performs the processes in the data transmission method in the first aspect.

It can be learned from the foregoing technical solutions that the embodiments of this application have the following advantages.

In the embodiments, the communications device obtains the dequeue information, where the dequeue information indicates the queue in which a data packet requests to be output in the communications device and the target data volume that is output from each queue at a time, and the target data volume is not greater than the burst value maintained by the communications device. Then, the communications device reads the sub-PD obtained by segmenting the first PD. The communications device may determine the target data packet based on the sub-PD, where the target data packet belongs to the first data packet set indicated by the first PD. Then, the communications device sends the target data packet. Because each PD in the communications device is segmented into a plurality of sub-PDs, and a size of a data packet indicated by each sub-PD is not greater than the burst value, a data volume sent by the communications device each time does not exceed the burst value, thereby reducing a probability of a packet loss of a downlink device.

DESCRIPTION OF EMBODIMENTS

The embodiments of this application provide a data transmission method, to avoid a packet loss of a downlink device caused by an output traffic burst of a communications device.

Figure 1:
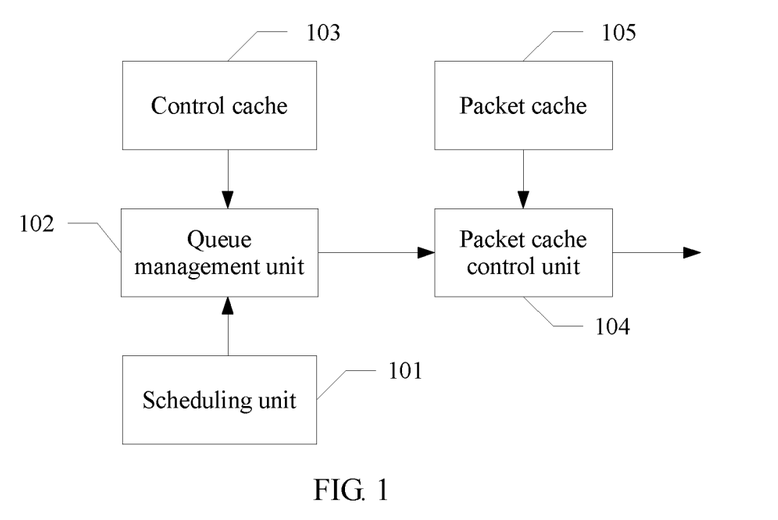
FIG. 1 is a schematic structural diagram of a system for scheduling data packet to dequeue.

The embodiments of this application may be applied to a communications device in a switching network such as a local area network or a wide area network. FIG. 1 is a schematic structural diagram of a part of a system of a communications device in a scenario in which a data packet is scheduled to dequeue. The communications device includes a scheduling unit 101, a queue management unit 102, a control cache 103, a packet cache control unit 104, and a packet cache 105. The foregoing system units are connected together using a bus. With reference to the foregoing system units, the following describes a specific process of scheduling, by the communications device, a data packet to dequeue.

The scheduling unit 101 is responsible for providing dequeue scheduling for the queue management unit 102. The queue management unit 102 includes a queue formed by PD pointers. The queue management unit 102 determines a corresponding queue based on the dequeue scheduling. The control cache 103 stores a PD set. Then, the queue management unit 102 reads, from the control cache 103, a PD corresponding to a PD pointer at a head of the queue. The packet cache control unit 104 receives a PD sent by the queue management unit 102, and then the packet cache control unit 104 may read a corresponding data packet from the packet cache 105 based on information included in the PD such as a start address, an end address, and a packet length of the data packet, and finally send the read data packet.

It may be understood that the queue in the queue management unit 102 is a logical queue formed by the PD pointers. A PD pointer indicates address information such as a start address or an end address of a data packet. Correspondingly, each logical queue corresponds to an entity queue formed by data packets in the packet cache 105. For each sending in the entity queue, a data volume corresponding to one PD needs to be used as a basic unit to arrange a corresponding data packet to dequeue. A downlink device with relatively poor burst tolerance may be unable to receive the data volume corresponding to one PD at a time. Such a traffic burst may cause a packet loss of the downlink device. Therefore, a mechanism for controlling an output traffic burst needs to be set in the communications device.

For ease of understanding, the following describes the specific process in the embodiments of this application.

Figure 2:
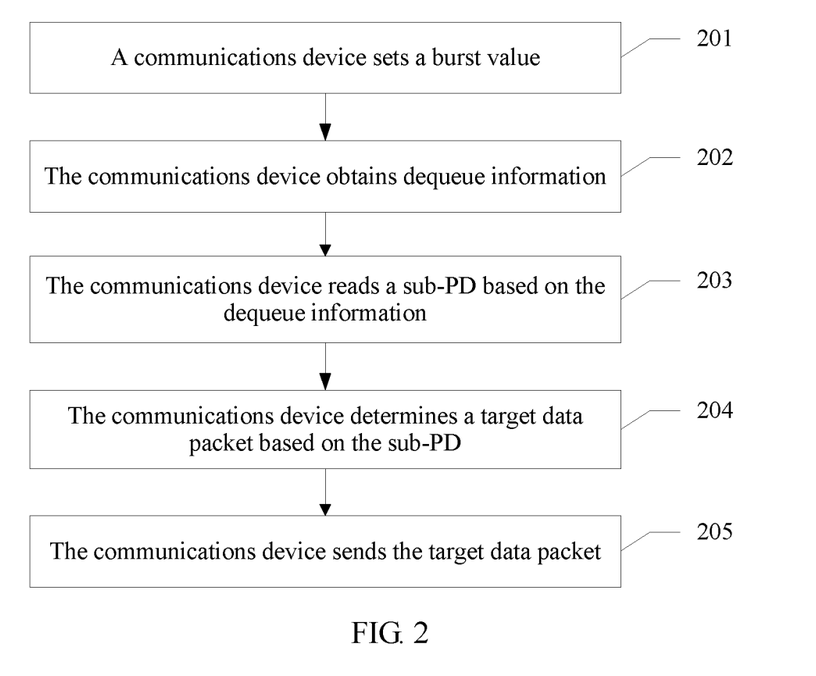
FIG. 2 is a schematic diagram of an embodiment of a data transmission method according to this application.

Referring to FIG. 2, an embodiment of the data transmission method in the embodiments of this application includes the following steps.

Step 201. A communications device sets a burst value.

In this embodiment, the communications device sets the burst value to control a data volume that is output from each queue at a time in the communications device. It may be understood that the burst value should be less than a size of a data packet set indicated by a PD. Because different downlink devices have different burst tolerance capabilities, in an actual application, the burst value should be as small as possible to ensure that a downlink device with a relatively poor burst tolerance avoids a packet loss caused by a large data volume of a single transmission. Therefore, a value of the burst value is subject to an actual application, and is not limited herein.

Step 202. The communications device obtains dequeue information.

In this embodiment, the communications device determines, according to a preset scheduling policy, a queue in which a data packet needs to be output, and generates the dequeue information. The communications device sends the dequeue information to the queue at a specified frequency. The dequeue information may indicate a target data volume that needs to be output from the queue at a time. It may be understood that the target data volume is not greater than the burst value.

It should be noted that different queues in the communications device include different streams. A stream is a set of data packets with same features, and different streams have different transmission speeds. It may be understood that, for a stream with a relatively high transmission speed, the dequeue information is sent at a relatively high frequency, and correspondingly, for a stream with a relatively low transmission speed, the dequeue information is sent at a relatively low frequency.

It should be noted that the communications device may determine one or more queues, and this is not limited herein.

Step 203. The communications device reads a sub-PD based on the dequeue information.

In this embodiment, the communications device determines, based on the dequeue information, the queue in which a data packet needs to be output, and then determines a first PD at a head of the queue from the queue, to further read the sub-PD obtained by segmenting the first PD.

It should be noted that each PD in the queue is segmented into a quantity of the sub-PDs. Each sub-PD may indicate at least one data packet. It may be understood that a PD is logically segmented into a plurality of sub-PDs. For example, a PD indicates a data packet set with a data volume of 8 kB, and the data packet set includes eight data packets of 1 kB. In this case, the PD stores information such as a start address, an end address, and a packet length of the data packet set, and eight sub-PDs obtained by segmenting the PD each store information such as a start address, an end address, and a packet length of a data packet of 1 kB.

It should be noted that a PD is segmented based on the burst value to obtain sub-PDs. For example, a PD indicates a data packet of 8 kB, the burst value is set to 1 kB, and the target data volume indicated by the dequeue information is also set to 1 kB based on the burst value. If each sub-PD is defined to indicate a data packet of 1 kB, one PD is segmented into eight sub-PDs correspondingly. If each sub-PD is defined to indicate a data packet of 512 Bytes (B), one PD is segmented into 16 sub-PDs. It may be understood that the PD is segmented in an equal division manner. Further, a quantity of the sub-PDs obtained by segmenting one PD is subject to an actual application, and is not limited herein.

It should be noted that the PD is stored in a control cache composed by an SRAM. Because each PD is segmented into a plurality of sub-PDs, and each sub-PD also needs to store information such as a packet length, and a start address and an end address of packet data in cache space, each sub-PD also needs to occupy storage space to store information related to a data packet. Although storage space occupied by each PD does not significantly differ from the storage space occupied by each sub-PD, a quantity of the sub-PDs is certainly far greater than a quantity of PDs. Therefore, total storage space that needs to be occupied by the sub-PDs is far greater than storage space occupied by the PDs. If all the sub-PDs are also stored in the control cache composed by the SRAM, costs are very high. Therefore, in this embodiment, the sub-PDs are stored in a packet cache, and the packet cache composed by a DRAM. The DRAM is much cheaper than the SRAM. Therefore, the costs may be effectively saved by storing the sub-PDs in the packet cache.

Step 204. The communications device determines a target data packet based on the sub-PD.

In this embodiment, the communications device may determine, based on the sub-PD, the target data packet indicated by the sub-PD. It may be understood that the communications device may know, based on the read sub-PD, information such as a start address, an end address, and a packet length of the target data packet, and then read the target data packet from the packet cache.

It should be noted that sub-PDs in a sub-PD set obtained by segmenting a PD are still arranged in sequence, that is, a queue sequentially reads corresponding sub-PDs in sequence based on the target data volume indicated by the dequeue information.

Step 205. The communications device sends the target data packet.

In this embodiment, after reading the target data packet from the packet cache, the communications device may send the target data packet. After the target data packet is output, the communications device repeatedly performs steps 202 to 205 based on subsequently received dequeue information.

In this embodiment, the communications device obtains the dequeue information, where the dequeue information indicates the queue in which a data packet waits to be output in the communications device and the target data volume that is output from each queue at a time, and the target data volume is not greater than the burst value maintained by the communications device. Then, the communications device reads the sub-PD obtained by segmenting the first PD. The communications device may determine the target data packet based on the sub-PD, where the target data packet belongs to a first data packet set indicated by the first PD. Then, the communications device sends the target data packet. Because each PD in the communications device is segmented into a plurality of sub-PDs, and a size of a data packet indicated by each sub-PD is not greater than the preset burst value, a data volume sent by the communications device each time does not exceed the preset burst value, thereby avoiding a packet loss of a downlink device.

The embodiment shown in FIG. 2 describes an implementation of controlling an output traffic burst of the communications device, and a traffic burst can be effectively controlled. However, different streams in the communications device have different transmission speeds. If a data packet in a stream with a relatively high transmission speed is also sent in strict accordance with the manner shown in FIG. 2, the transmission speed of the stream is limited to some extent. The following describes a more flexible data transmission method based on the embodiment shown in FIG. 2.

Figure 3:
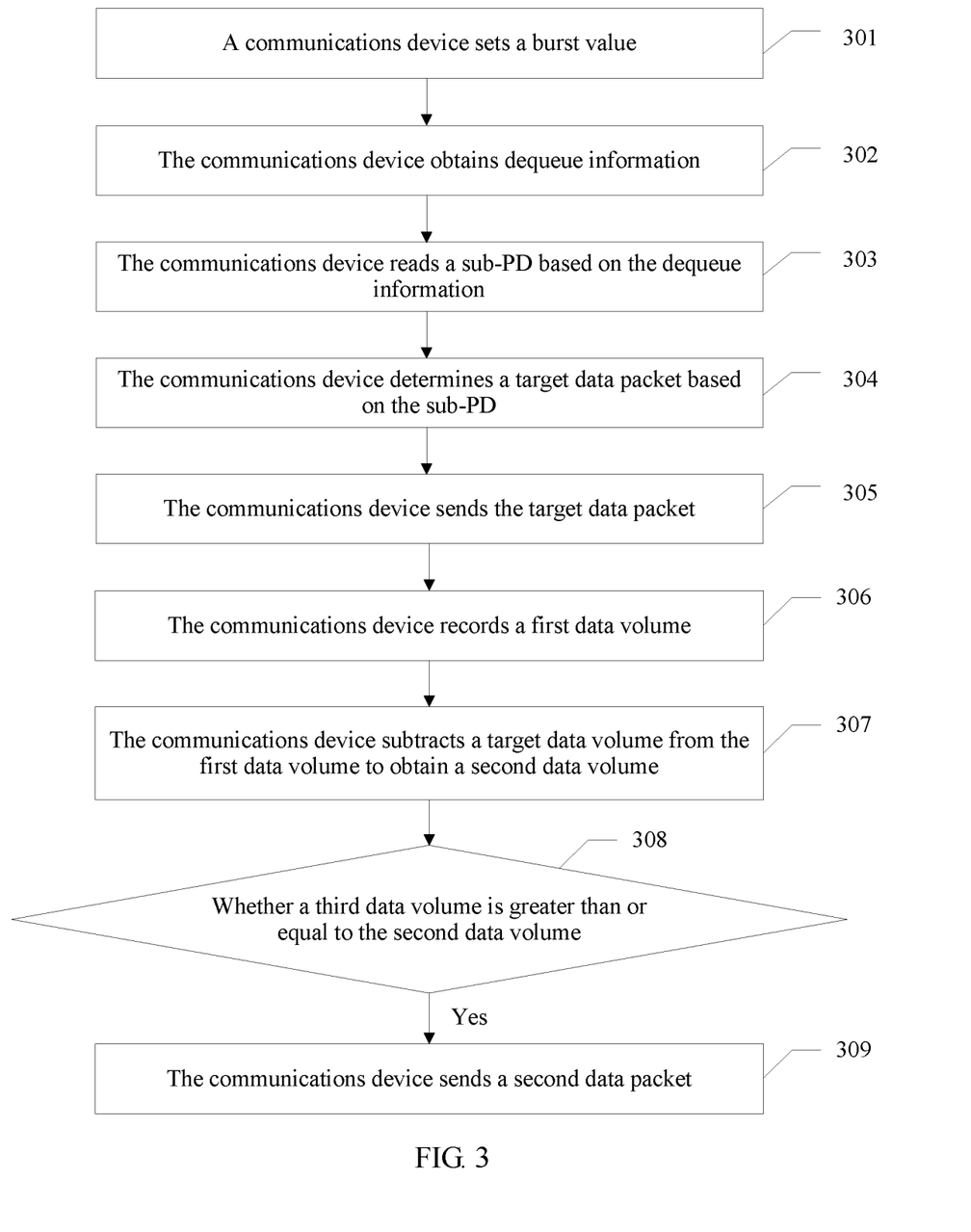
FIG. 3 is a schematic diagram of another embodiment of a data transmission method according to this application.

Referring to FIG. 3, another embodiment of the data transmission method in the embodiments of this application includes the following steps.

Step 301. A communications device sets a burst value.

Step 302. The communications device obtains dequeue information.

Step 303. The communications device reads a sub-PD based on the dequeue information.

Step 304. The communications device determines a target data packet based on the sub-PD.

Step 305. The communications device sends the target data packet.

In this embodiment, step 301 to step 305 are similar to step 201 to step 205 in the embodiment shown in FIG. 2. Details are not described herein again.

Step 306. The communications device records a first data volume.

In this embodiment, after determining a first PD at a head of a queue from the queue, the communications device records the first data volume corresponding to the first PD into a queue burst control table. It may be understood that the first data volume is a size of a data packet set indicated by the first PD.

It should be noted that there is no fixed time sequence relationship between step 306 and step 305. Step 305 may be performed first, or step 306 may be performed first. Alternatively, step 305 and step 306 may be performed at the same time. This is not limited herein.

Step 307. The communications device subtracts a target data volume from the first data volume to obtain a second data volume.

In this embodiment, after sending the target data packet, the communications device subtracts the target data volume from the first data volume to obtain the second data volume. It may be understood that a total size of second data packets that remain after output target data packets are subtracted from the data packet set indicated by the first PD is the second data volume.

It should be noted that the second data volume is not a fixed value, and the second data volume continuously decreases with continuous output of data packets in the queue.

Step 308. The communications device determines whether a third data volume is greater than or equal to the second data volume, and performs step 309 if the third data volume is greater than or equal to the second data volume.

In this embodiment, if a data volume indicated by previous dequeue information has not yet been fully output, and at this time, next dequeue information has been sent to a same queue, the next dequeue information is accumulated, and a data volume indicated by the accumulated dequeue information is the third data volume. It may be understood that the third data volume is not a fixed value either, and continuously increases with accumulation of dequeue information. After outputting a target data volume indicated by dequeue information each time, the communications device determines whether a current third data volume is greater than or equal to a current second data volume.

Step 309. The communications device sends a second data packet.

In this embodiment, when the third data volume is greater than or equal to the second data volume, the communications device sends the second data packet. It may be understood that the communications device may read the first PD from a control cache to know description information related to the data packet set indicated by the entire PD, and the communications device also knows in advance description information related to an output data packet. Therefore, the communications device may read a second PD indicating the second data packet, and then may read the second data packet from a packet cache based on the second PD and send the second data packet.

It should be noted that there is a latency for the communications device to read a sub-PD from the packet cache. The dequeue information is sent to a stream with a relatively high transmission speed at a relatively high frequency. Therefore, it is possible that a data volume indicated by previous dequeue information has not yet been fully output, and next dequeue information has already arrived. In this case, the dequeue information is accumulated. The dequeue information is sent to a stream with a relatively low transmission speed at a relatively low frequency. After the data volume indicated by the previous dequeue information is output, the next dequeue information has not arrived. In this case, the dequeue information cannot be accumulated. It may be understood that, in this embodiment, because the dequeue information cannot be accumulated, for the stream with a relatively low transmission speed, data is still transmitted according to the implementation of the embodiment shown in FIG. 2. However, for the stream with a relatively high transmission speed, the dequeue information can be continuously accumulated. To ensure that a stream transmission speed is not greatly limited, a data transmission manner is adjusted in a determining manner in this embodiment. In this way, for the entire communications device, a traffic burst of the stream with a relatively low transmission speed can be controlled to a maximum extent, the transmission speed of the stream with a relatively high transmission speed cannot be greatly limited, and such a data transmission manner is more flexible.

The following describes, using an example scenario, the embodiment shown in FIG. 3.

For example, a PD corresponds to a data volume of 8 kB, a burst value is set to 1 kB, and dequeue information is also set to 1 kB. One PD is segmented into eight sub-PDs, and each sub-PD corresponds to a data volume of 1 kB. In this case, a data volume of 1 kB is output from a queue each time, and two pieces of dequeue information are accumulated after a data volume of 2 kB is output from the queue. However, a data volume of 6 kB remains in the data volume of 8 kB managed by the PD, and the data volume of 2 kB corresponding to the two pieces of dequeue information is less than 6 kB. Therefore, a data volume of 1 kB continues to be output each time. After a data volume of 4 kB is output, a data volume of 4 kB remains in the data volume of 8 kB managed by the PD. In this case, four pieces of dequeue information are accumulated, and the four pieces of dequeue information correspond to a data volume of 4 kB. In this case, the remaining data volume of 4 kB is sent once.

The foregoing describes a congestion stream identification method in the embodiments of this application. The following describes a network device in the embodiments of this application.

Figure 4:
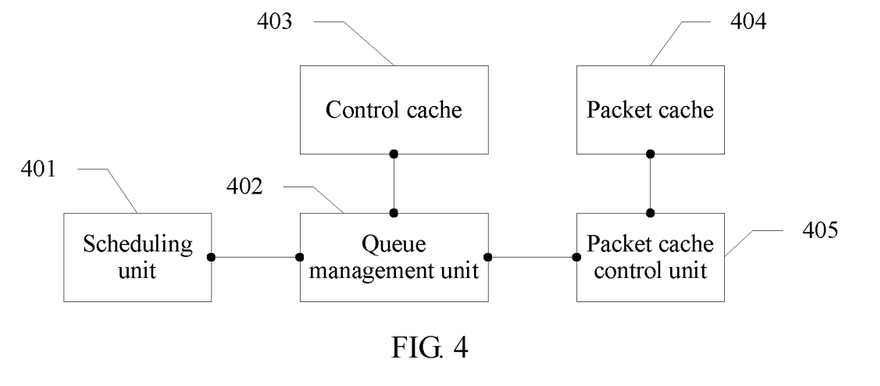
FIG. 4 is a schematic diagram of an embodiment of a communications device according to this application.

Referring to FIG. 4, an embodiment of the communications device in the embodiments of this application includes a scheduling unit 401, a queue management unit 402, a control cache 403, a packet cache 404, and a packet cache control unit 405.

The scheduling unit 401 is configured to send dequeue information, where the dequeue information indicates a target data volume that is output from each queue at a time, and the scheduling unit maintains a burst value, and manages the target data volume based on the burst value such that the target data volume is not greater than the burst value.

The queue management unit 402 is configured to determine, based on received dequeue information, a queue which requests to output data, where the queue includes a first PD.

The control cache 403 stores the first PD, where the first PD includes first description information used to indicate a first data packet set.

The packet cache 404 stores a sub-PD set and the first data packet set, where the sub-PD set is obtained by segmenting the first PD, a sub-PD in the sub-PD set includes target description information used to indicate a target data packet, and the first data packet set includes the target data packet.

The packet cache control unit 405 is configured to read a sub-PD based on the queue, then determine a target data packet based on the read sub-PD, and send the target data packet.

The queue management unit 402 is further configured to determine the first PD at a head of the queue, where the head of the queue refers to an end close to an output port in the queue.

The packet cache control unit 405 is further configured to read the sub-PD that ranks first in the sub-PD set, where each sub-PD in the sub-PD set is obtained by segmenting the first PD, and the ranking indicates a sequence of reading sub-PDs in the sub-PD set by the packet cache control unit.

In this embodiment of this application, the scheduling unit 401 sends the dequeue information. The queue management unit 402 determines, based on the dequeue information, the queue in which a data packet requests to be output and the first PD at a head of the queue. The dequeue information indicates the target data volume that is output from each queue at a time, and the target data volume is not greater than the burst value maintained by the communications device. Then, the packet cache control unit 405 reads, from the packet cache 404, the sub-PD obtained by segmenting the first PD, and determines the target data packet based on the read sub-PD, and sends the target data packet. Because each PD in the communications device is segmented into a plurality of sub-PDs, and a size of a data packet indicated by each sub-PD is not greater than the burst value, a data volume sent by the communications device each time does not exceed the burst value, thereby reducing a probability of a packet loss of a downlink device.

For ease of understanding, the following describes the communications device in the embodiments of this application based on a more flexible data transmission method.

Figure 5:
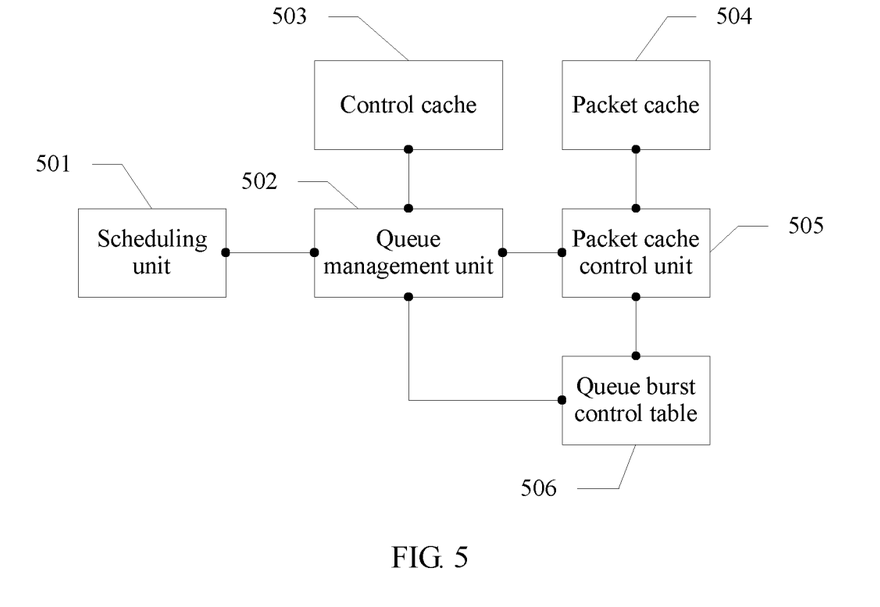
FIG. 5 is a schematic diagram of another embodiment of a communications device according to this application.

Referring to FIG. 5, an embodiment of the communications device in the embodiments of this application includes a scheduling unit 501, a queue management unit 502, a control cache 503, a packet cache 504, a packet cache control unit 505, and a queue burst control table 506.

The scheduling unit 501 is configured to send dequeue information, where the dequeue information indicates a target data volume that is output from each queue at a time, and the scheduling unit maintains a burst value, and manages the target data volume based on the burst value such that the target data volume is not greater than the burst value, the queue management unit 502 is configured to determine, based on received dequeue information, a queue which requests to output data, where the queue includes a first PD, the control cache 503 stores the first PD, where the first PD includes first description information used to indicate a first data packet set, the packet cache 504 stores a sub-PD set and the first data packet set, where the sub-PD set is obtained by segmenting the first PD, a sub-PD in the sub-PD set includes target description information used to indicate a target data packet, and the first data packet set includes the target data packet, and the packet cache control unit 505 is configured to read a sub-PD based on the queue, then determine a target data packet based on the read sub-PD, and send the target data packet.

The queue management unit 502 is further configured to determine the first PD at a head of the queue, where the head of the queue refers to an end close to an output port in the queue.

The packet cache control unit 505 is further configured to read the sub-PD that ranks first in the sub-PD set, where each sub-PD in the sub-PD set is obtained by segmenting the first PD, and the ranking indicates a sequence of reading sub-PDs in the sub-PD set by the packet cache control unit.

The queue burst control table 506 is configured to record a first data volume, where the first data volume is a size of the first data packet set indicated by the first PD.

The queue burst control table 506 may further be configured to record a second data volume, where the second data volume is obtained by subtracting the target data volume from the first data volume, and the second data volume is a size of a second data packet that remains after the target data packet is subtracted from the first data packet set.

The queue burst control table 506 may further be configured to record a third data volume, where the third data volume is a data volume indicated by an accumulated dequeue information set.

The packet cache control unit 505 is further configured to when the third data volume is greater than the second data volume, read a second PD, and send the second data packet indicated by the second PD.

The foregoing describes the communications device in the embodiments of the present disclosure from a perspective of a modular functional entity. The following describes the communications device in the embodiments of the present disclosure from a perspective of hardware processing.

Figure 6:
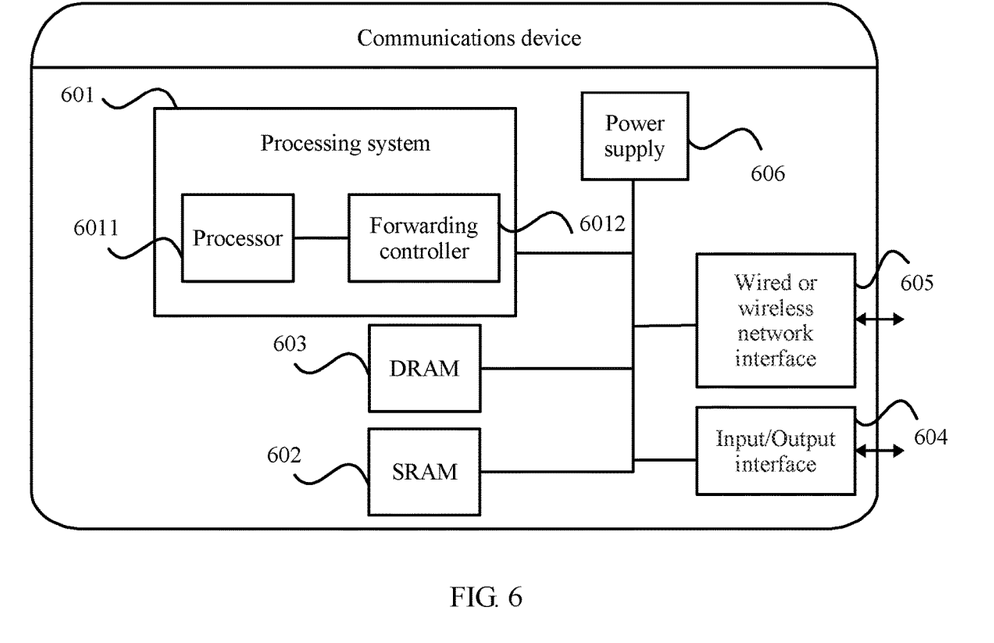
FIG. 6 is a schematic diagram of another embodiment of a communications device according to this application.

Referring to FIG. 6, an embodiment of the communications device in this application may include one or more processing systems 601, an SRAM 602, a DRAM 603, an input/output interface 604, a wired or wireless network interface 605, and a power supply 606.

The processing system 601 further includes a processor 6011 and a forwarding controller 6012.

The SRAM 602 stores a PD, and the DRAM 603 stores a data packet and a sub-PD.

In this embodiment, the processing system 601 may perform the operations performed by the communications device in the embodiments shown in FIG. 2 and FIG. 3. Details are not described herein again.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes any medium that can store program code, such as a Universal Serial Bus (USB) flash drive, a removable hard disk, a read-only memory (ROM), a random-access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data transmission method implemented by a communications device, the data transmission method comprising:
   obtaining dequeue information, wherein the dequeue information indicates a queue requesting to output data in the communications device and a target data volume that is output from each of a plurality of queues at a time, wherein the queue comprises a first packet descriptor (PD), wherein the first PD comprises first description information indicating a first data packet set, where the first data packet set comprises a target data packet, wherein the first PD is stored in a control cache, and wherein the control cache is a static random-access memory (SRAM);
   segmenting the first PD to obtain a sub-PD, wherein a quantity of sub-PDs is greater than or equal to two, wherein the sub-PD comprises target description information indicating the target data packet, wherein the first data packet set and the sub-PD are stored in a packet cache, and wherein the packet cache is a dynamic random-access memory (DRAM);
   maintaining a burst value;
   managing the target data volume based on the burst value to keep the target data volume less than or equal to the burst value;
   reading the sub-PD based on the queue;
   obtaining the target data packet based on the sub-PD; and
   sending the target data packet.

2. The data transmission method of claim 1, further comprising obtaining the first PD at a head of the queue, wherein the head of the queue is an end of the queue from which the first PD is obtained.

3. The data transmission method of claim 2, further comprising:
   obtaining a sub-PD set by segmenting the first PD; and
   obtaining a ranking in the sub-PD set, wherein the ranking indicates a sequence of reading sub-PDs in the sub-PD set, and wherein the sub-PD ranks first in the sub-PD set.

4. The data transmission method of claim 2, wherein after obtaining the first PD, the data transmission method further comprises recording a first data volume, and wherein the first data volume is a size of the first data packet set.

5. The data transmission method of claim 4, wherein after sending the target data packet, the data transmission method further comprises subtracting the target data volume from the first data volume to obtain a second data volume, and wherein the second data volume is a size of a second data packet that remains after the target data packet is subtracted from the first data packet set.

6. The data transmission method of claim 5, wherein after sending the target data packet, the data transmission method further comprises:
   identifying that a third data volume indicated by a dequeue information set accumulated in the communications device is greater than the second data volume;
   reading a second PD in response to identifying the third data volume, wherein the second PD indicates the second data packet; and
   sending the second data packet.

7. A communications device comprising:
   a memory configured to store instructions; and
   a processor coupled to the memory, wherein the instructions cause the processor to be configured to:
      obtain dequeue information, wherein the dequeue information indicates a target data volume that is output from each of a plurality of queues at a time;
      maintain a burst value;
      manage the target data volume based on the burst value to keep the target data volume less than or equal to the burst value;
      obtain, based on the dequeue information, a queue requesting to output data, wherein the queue comprises a first packet descriptor (PD), wherein the first PD comprises first description information indicating a first data packet set, wherein the first data packet set comprises a target data packet, wherein the first PD is stored in a control cache, and wherein the control cache is a static random-access memory (SRAM);
      segment the first PD to obtain a sub-PD, wherein the sub-PD comprises target description information indicating the target data packet, wherein a quantity of sub-PDs is greater than or equal to two;
      read a sub-PD based on the queue, wherein the first data packet set and the sub-PD are stored in a packet cache, and wherein the packet cache is a dynamic random-access memory (DRAM);
      obtain the target data packet based on the sub-PD; and
      send the target data packet.

8. The communications device of claim 7, wherein the instructions further cause the processor to be configured to obtain the first PD at a head of the queue, and wherein the head of the queue is an end of the queue from which the first PD is obtained.

9. The communications device of claim 7, wherein the instructions further cause the processor to be configured to:
segment the first PD to obtain a sub-PD set; and
obtaining a ranking in the sub-PD set, wherein the ranking indicates a sequence of reading sub-PDs in the sub-PD set, and wherein the sub-PD ranks first in the sub-PD set.

10. The communications device of claim 7, wherein the instructions further cause the processor to be configured to record a first data volume in a queue burst control table, and wherein the first data volume is a size of the first data packet set.

11. The communications device of claim 10, wherein the instructions further cause the processor to be configured to:
subtract the target data volume from the first data volume to obtain a second data volume, wherein the second data volume is a size of a second data packet that remains after the target data packet is subtracted from the first data packet set; and
record the second data volume in the queue burst control table.

12. The communications device of claim 11, wherein the instructions further cause the processor to be configured to record a third data volume in the queue burst control table, and wherein the third data volume is a data volume indicated by an accumulated dequeue information set.

13. The communications device of claim 12, wherein the instructions further cause the processor to be configured to:
identify that the third data volume is greater than the second data volume;
read a second PD in response to identifying the third data volume; and
send the second data packet indicated by the second PD.

14. A communications device comprising:
a static random-access memory (SRAM) configured to store a first packet descriptor (PD), wherein the first PD comprises first description information indicating a first data packet set, and wherein the first data packet set comprises a target data packet;
a dynamic random-access memory (DRAM) coupled to the SRAM and configured to store a sub-PD set and the first data packet set; and
a processing system coupled to the SRAM and the DRAM and comprising:
a processor configured to:
segment the first PD to obtain the sub-PD set, wherein a sub-PD in the sub-PD set comprises target description information indicating the target data packet;
generate dequeue information, wherein the dequeue information indicates a queue requesting to output data in the communications device and a target data volume that is output from each of a plurality of queues at a time;
maintain burst value, and
manage the target data volume based on the burst value to keep the target data volume less than or equal to the burst value; and
a forwarding controller configured to:
read the sub-PD based on the queue;
determine the target data packet based on the sub-PD; and
send the target data packet.

* * * * *